BIASING SYSTEM FOR MAGNETIC RECORDERS

Filed April 25, 1947

INVENTOR.
WALTER HOWEY

BY Ezekiel Wolf
ATTORNEY

Patented Apr. 10, 1951

2,548,109

UNITED STATES PATENT OFFICE 2,548,109

BIASING SYSTEM FOR MAGNETIC RECORDERS

Walter Howey, Demarest, N. J.

Application April 25, 1947, Serial No. 743,931

4 Claims. (Cl. 179—100.2)

This invention relates to magnetic telegraphones. It has for one purpose the magnetic recording of audible intelligence picked up by hearing aid microphones, amplified by sub-miniature electronic toubes, powered by hearing aid batteries, on fine wire wound on spools by a miniature motor—all of which is encompassed in a casette.

It has for another purpose a new method of telegraphone recording on a straight line portion of the magnetization curve, with the use of a high magnetizing current in the supersonic frequency range acting upon the polarized telegraphone recorder field. Audio frequency waves are recorded in this doubly biased field. The method may in a physical sense be called dynamic wire recording since the effect of supersonic frequency alternatively re-enforces and diminishes by half cycles the polar equilibrium of a polarized electromagnetic field through which the magnetic record medium is moved and by which it is magnetized with the audio frequency recording.

Three magnetizing forces are concentrated in this telegraphone recording field, i. e., a polarizing force, the oscillations of the supersonic frequency, and those of the audio frequency.

The polarizing force should preferably be adjusted so that the audio frequency oscillations will displace the high frequency oscillations about the line of saturation of the magnetizing curve. It is well known that high permeable magnetic alloys like so-called "Mumetal," "Permalloy" and "Hyperloy" become readily saturated with a small magnetizing current, and that for a slight change in magnetization in the straight part of the hysteresis curve, a great change in flux occurs. In fact, above saturation the B—H curve is flat and straight. In the present invention the magnetization resulting from the audio frequency current brings a portion of the high frequency steady state oscillations into the steep sloped portion of the magnetizing curve, inducing discrete magnetizing unidirectional pulses with amplified characteristics on the wire itself. Thus the magnet acts in this way both as a rectifier and amplifier without distortion.

The invention, its merits and advantages will be better understood from the specification below, when taken in connection with the drawings, in which Fig. 1 shows an electrical circuit embodying the invention;

Figures 1, 2, 3:
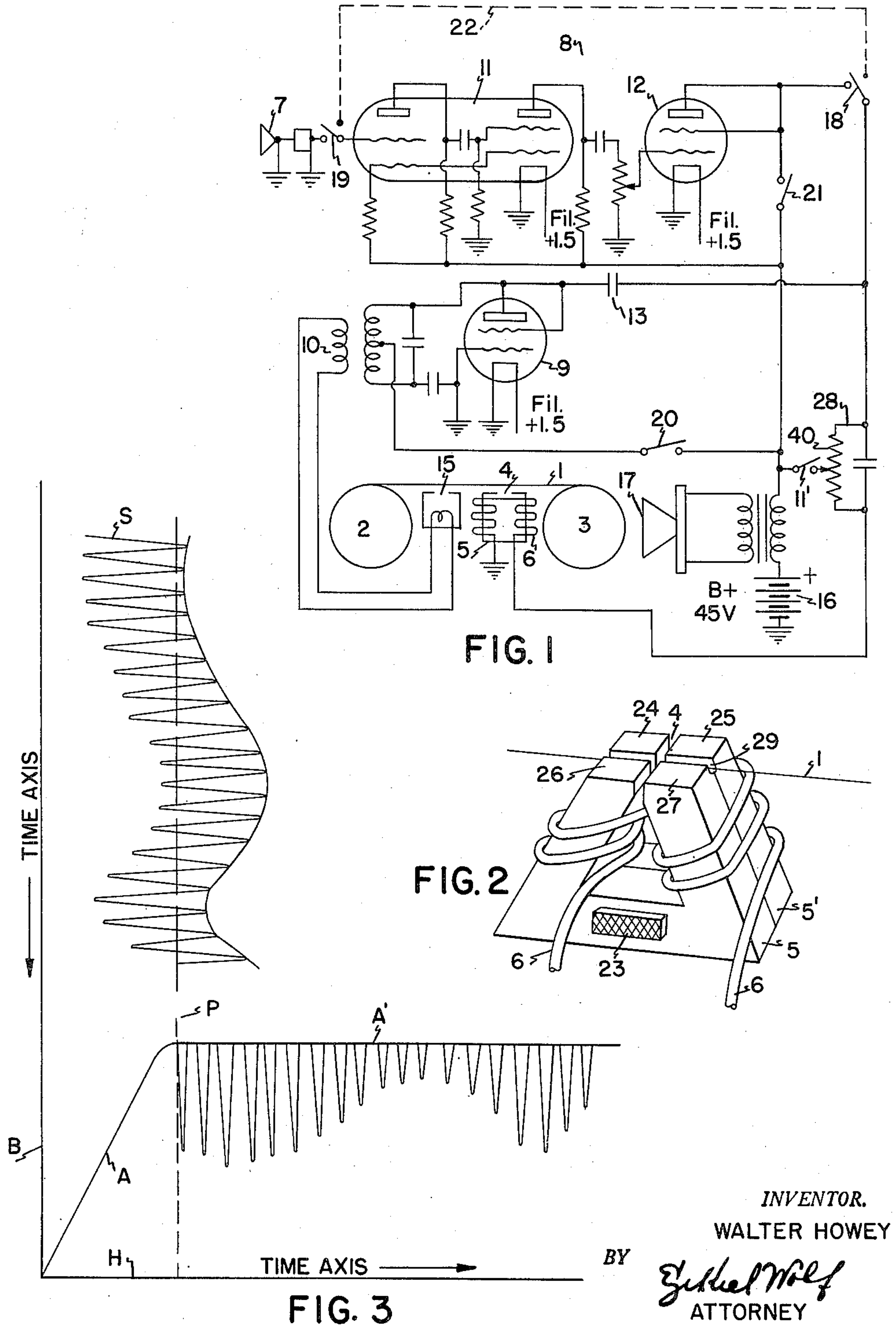
Fig. 2 shows in perspective the telegraphone magnet and wire.
Fig. 3 shows curves illustrating the operation of the system.

Fig. 1 discloses wire 1 reeled from spool 2 to spool 3 through the electromagnetic field of gap 4 in telegraphone recorder 5, details of which are shown in Fig. 2. In a pocket model, which may be used for recording only, electromagnet 5 is polarized by a permanent magnet or D. C. current or both. Supersonic biasing current from oscillator 9, which is a conventional oscillating unit well known in the art, is impressed upon coil 6 of recorder 5 across resonant capacitor 13. Audio frequency current from microphone 7 and audio frequency amplifier 8, which is a conventional high gain hearing aid unit well known in the art, is introduced by direct coupling to coil 6 which behaves as the plate impedance. Supersonic biasing oscillating frequency may be chosen between 20 kc. and 80 kc. Wire 1 may be 2 to 4 mils outer diameter. The supersonic biasing current, when derived from miniature batteries and sub-miniature tubes, is insufficient in itself to afford sufficient bias for audio frequency recording upon a straight line portion of the hysteresis loop, but with the combination of the polarizing biasing current or the permanent magnetizing of the cores has proved to be more than sufficient to produce audible recording. The supersonic current in upsetting this polarized balance enhances the value of the biasing field at gap 4. Audio frequency waves from amplifier 8, which vary both in frequency and amplitude, produce the net rectified pulse polarization or magnetization of the wire, as will be explained in connection with Fig. 3.

The one advantage of the permanent magnet in miniature recorders is economy in battery voltage. A disadvantage is the fact that a permanent magnet telegraphone unit may not be used for good sound reproduction.

I prefer an induction magnet suitable for recording and reproduction which is polarized by unidirectional current derived from battery 16 through the plate circuit of output tube 12 of amplifier 8. Tube 11 is a dual stage amplifier preceding power tube 12.

The supersonic biasing current from oscillator 9 and the audio frequency current from amplifier 8 are mixed but the audio frequency component is not modulated. The unmodulated audio frequency signals may be heard in phones and when viewed by "scope" both waves may be distinguished. The amount of polarizing current flowing in coil 6 is varied by the audio frequency amplitude of the amplifier output tube.

This is all to the good because it steps up the polarizing bias with the rise of the audio frequency signal. The impedance of magnet coil 6 may be about 4,000 ohms mismatched to look into an impedance of about 40,000 ohms in the cathode anode circuit of the tube 12. This mismatch is purposely designed to attenuate lower audio frequencies without the loss in battery power which would be caused by the use of a great number of turns to obtain the desired impedance and current dissipation and hysteresis losses in capacitances and inductances used in conventional frequency equalization means.

The quality of speech which may be recorded by this impedance mismatch provides a clarity of enunciation by low frequency attenuation which compares favorably with the behavior of the very best wire recorders of hugh bulk and weight. Polarizing direct current when used alone for bias in conjunction with audio frequency signals produces a high magnetic noise level and low fidelity records. My method of maintaining the magnetized core in the region of saturation by means of the direct current bias except for the excursions of the supersonic demagnetizing and magnetizing action as modified by the audio frequency current eliminates to a great extent induced voltages caused by variations in direct current which are a source of noise which sometimes rises to objectionable levels. Polarizing current is impressed upon the coil 6 from the battery 16 through the potentiometer 40 connected in the output of the tube 12 by means of the switch 11' and through the output circuit of tube 12. The noise level in the present system is 20 decibels below that produced by ordinary direct current polarization.

This invention may be used with large tubes and power sources. The circuit shown may be used for reproduction by switching the input of implifier 8 from microphone 7 to electromagnetic unit 5 and switching the output of amplifier 8 to loudspeaker 17 and disconnecting oscillator 9. Switches 18 and 19 and circuit 22 (indicated by dotted lines) accomplish this purpose. Switch 20 disconnects oscillator 9. Switch 21 introduces the speaker output transformer for reproduction. (Switch 11' should be opened when 21 is closed.) All switches may be ganged.

For erasure of prior history with the unit having large tubes and power source, erase current from oscillator 9 is conveyed by coil 10 to coil 14 of erase head 15. Erase head 15 is positioned so that the record medium in moving from spool 2 to spool 3 has its magnetic history erased before it reaches gap 4 of recording head 5. Opening switch 20 takes erase head 15 out of the circuit during reproduction.

Fig. 2 discloses a preferred type of recording head consisting of two electromagnets 5 and 5' having four pole pieces 24, 25, 26, and 27. Wire 1 passes gap 4 between pole pieces 24 and 25 on one side of the wire and 26 and 27 on the opposite side of the wire. This arrangement provides a concentrated field surrounding wire 1 having the advantage of both longitudinal and transverse magnetization. A longitudinal magnetization field is set up in gap 4 between pole pieces 24—26 and 25—27. Transverse magnetizing fields are propagated between pole pieces 24—26, 24—27 and 25—26. The gaps are made as small as possible and may vary between .002 inch and .0005 inch. The faces of the pole pieces may be copper plated and the magnets separated by copper plating. Coil 6 is wound around poles 24—26 and 25—27 in a humbuck relation. Coil 6 is energized by polarizing direct current, supersonic biasing current, and audio frequency current. It is the prevailing practice to confine supersonic current and audio frequency current to separate coils. The present method finds advantage in the use of one coil for three types of current. The head is wound with 1500 turns #44 double enamel copper wire on each pair of legs 24—26 and 25—27 of the two magnets. The four pole piece units are made unidimensional. The wire moves in a straight slot 29 between the magnets 5 and 5'. The copper plated gap offers low resistance to the magnetic field and serves as a lubricant for the wire and an electrostatic shield.

Dual magnets 5 and 5' are formed of metal or alloys of high permeability and low reluctance, such as Mumetal or molybdenum Permalloy. They may be polarized also by a permanent magnet element indicated by inset 23 in place of or in addition to direct current.

Fig. 3 shows the theory of operation upon which the present invention is believed to work. The curve A shows the magnetization curve of the recorder magnet of "Mumetal" or the like with the magnetization H as abscissae and B as flux in the usual manner. The three voltages impressed on the recorder head to produce the instantaneous magnetization at any instant comprises the D. C. polarizing field P which is of a value sufficient to carry the magnetization preferably into the region of saturation as in the level section A' of the curve A. The supersonic A. C. component which may range anywhere, as for instance as high as 80 kc., but which is constant in amplitude at least in the sections herein considered, will vary the magnetization substantially symmetrically on either side of the D. C. polarization, dipping down into the steep sloping portion of the B—H curve A. The audio component will vary or displace the position of the supersonic component in accordance with the sound signal impressed on the recorder magnet or head. The resultant magnetizing wave on the time axis will therefore be converted to the resultant flux wave on its true axis as represented by discrete unidirectional impulses of a frequency near that of the supersonic frequency, exhibiting an amplitude of the audio frequency signal amplified in the ratio of $\mu$ over the straight steep portion of the curve A. It will be seen from the curves that slight variations in the polarizing current will have little effect on the signal, provided the polarizing current is in the region of saturation, and that as a result noise caused by it will be very low.

Having now described my invention, I claim:

1. In telegraphone magnetic recording device, two electromagnets each having two poles and a field gap between two poles, means for moving a magnetizable record medium through an aperture between them and means passing polarizing direct current, supersonic current simultaneously and audio frequency current through energizing windings on the cores of the electromagnets and means whereby the magnitudes of the supersonic current and polarizing direct current have values such that the audio frequency oscillations will displace the high frequency oscillations about the point of saturation of the magnetizing curve of the electromagnets.

2. Means for telegraphone recording including a recording head and recording element, comprising in combination with said telegraphone recording head having a core of highly permeable metal, an electronic circuit having an audio frequency amplifying stage, a supersonic oscillator, and a direct current polarizer, and means associated with said circuit, oscillator and polarizer for impressing supersonic current derived from the supersonic oscillator, audio frequency current derived from said audio amplifier and direct current derived from said polarizer, upon said recording head, all simultaneously, and means whereby the magnitudes of the supersonic current and polarizing direct current have values such that the audio frequency oscillations will displace the high frequency oscillations about the point of saturation of the magnetizing curve of said core.

3. Means for telegraphone recording including a recording head and recording element, comprising in combination with said telegraphone record head having a core of highly permeable metal, an electronic circuit having an audio frequency amplifying stage, a supersonic oscillator, and a direct current polarizer, and means for producing each of the required fields of the required strength in the head associated with said circuit, oscillator and polarizer for impressing the magnetizing forces thereof on said head simultaneously, said polarizer magnetizing said core beyond saturation.

4. Means for telegraphone recording including a recording head and recording element, comprising in combination with said telegraphone record head having a core of highly permeable metal, an electronic circuit having an audio frequency amplifying stage, a supersonic oscillator, and a direct current polarizer, means included in the output of said amplifying stage for causing the amplitude of the audio frequency to vary the force of the polarizing direct current, and means for producing each of the required fields of the required strength in the head associated with said circuit, oscillator, and polarizer for impressing the magnetizing forces thereon on said head.

WALTER HOWEY.

REFERENCES CITED

The following references are of record in the file of this patent:

UNITED STATES PATENTS

| Number | Name | Date |
|---|---|---|
| 1,640,881 | Carlson | Aug. 30, 1927 |
| 1,886,616 | Alverson | Nov. 8, 1932 |
| 2,300,320 | Swartzel | Apr. 20, 1943 |
| 2,317,199 | Kirschbaum | Oct. 27, 1943 |
| 2,325,844 | Fischer | Aug. 3, 1943 |
| 2,351,004 | Camras | June 13, 1944 |
| 2,428,449 | Camras | Oct. 7, 1947 |

FOREIGN PATENTS

| Number | Country | Date |
|---|---|---|
| 218,407 | Switzerland | Mar. 16, 1942 |
| 883,022 | France | June 22, 1943 |